United States Patent
Allison (10) Patent No.: US 7,003,764 B2
(45) Date of Patent: Feb. 21, 2006

(54) METHOD AND APPARATUS FOR DYNAMIC CONFIGURATION OF A LEXICAL ANALYSIS PARSER

(75) Inventor: David S. Allison, San Ramon, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 640 days.

(21) Appl. No.: 09/977,526

(22) Filed: Oct. 12, 2001

(65) Prior Publication Data

US 2003/0074190 A1    Apr. 17, 2003

(51) Int. Cl.
G06F 9/45    (2006.01)

(52) U.S. Cl. .......................... 717/143; 707/6
(58) Field of Classification Search ........ 717/139–144; 707/6
See application file for complete search history.

(56) References Cited

U.S. PATENT DOCUMENTS 5,926,814 A * 7/1999 Fridman ........................ 707/6

6,715,141 B1 * 3/2004 Hodge ......................... 717/139

OTHER PUBLICATIONS

Hembigner, "CU Arcadia Project Software System," Mar. 15, 1996, pp. 1-6.*

* cited by examiner

Primary Examiner—Kakali Chaki
Assistant Examiner—Lawrence Shrader
(74) Attorney, Agent, or Firm—Osha Liang LLP (57) ABSTRACT

The present invention provides a method and apparatus for the lexical analysis of computer source code. The lexical analyzer is dynamically configured at runtime to recognize a one or more reserved words or operators. Thus, the analyzer has the ability to interact with multiple languages. In one or more embodiments of the present invention, the analyzer is instantiated by a host application, for example, the parser of a compiler. The host application adds a list of tokens to the analyzer that must be recognized. These tokens comprise at least a subset of the reserved words and operators of the computer language. In one embodiment, the host application then queries the analyzer for the next token in the source code. In another embodiment, tokens are added during the query phase as needed. In a separate embodiment, tokens are dynamically removed from the analyzer as the needs of the host application change.

27 Claims, 8 Drawing Sheets

METHOD AND APPARATUS FOR DYNAMIC CONFIGURATION OF A LEXICAL ANALYSIS PARSER

BACKGROUND OF THE INVENTION

1. Field of the Invention

The present invention relates to the field of computer software, and in particular to a lexical analyzer that can be configured at runtime to accept multiple languages.

Sun, Sun Microsystems, the Sun logo, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

Computer software, which comprises one or more computer instructions, must be processed by a system known as a "compiler" before it can be executed by an intended computing environment. More specifically, the software steps by which a human is able to give instructions to a computer must be transformed by the compiler into a machine readable form for execution by processing hardware units. Thus, the function of a compiler is to transform computer instructions existing in a first representation (i.e., one understandable by a human) to computer instructions existing in a second representation (i.e., one understandable by a machine).

One component of a compiler is called a lexical analyzer. The lexical analyzer scans the characters of the source code and divides them into tokens for use in later compilation steps. Current lexical analyzers are static, meaning they will only scan for tokens known at the time the lexical analyzer was made. Thus, each lexical analyzer is bound to a certain token set which cannot easily be changed. Before discussing this problem, an overview of a compiler is provided.

Compiler

Figure 1:
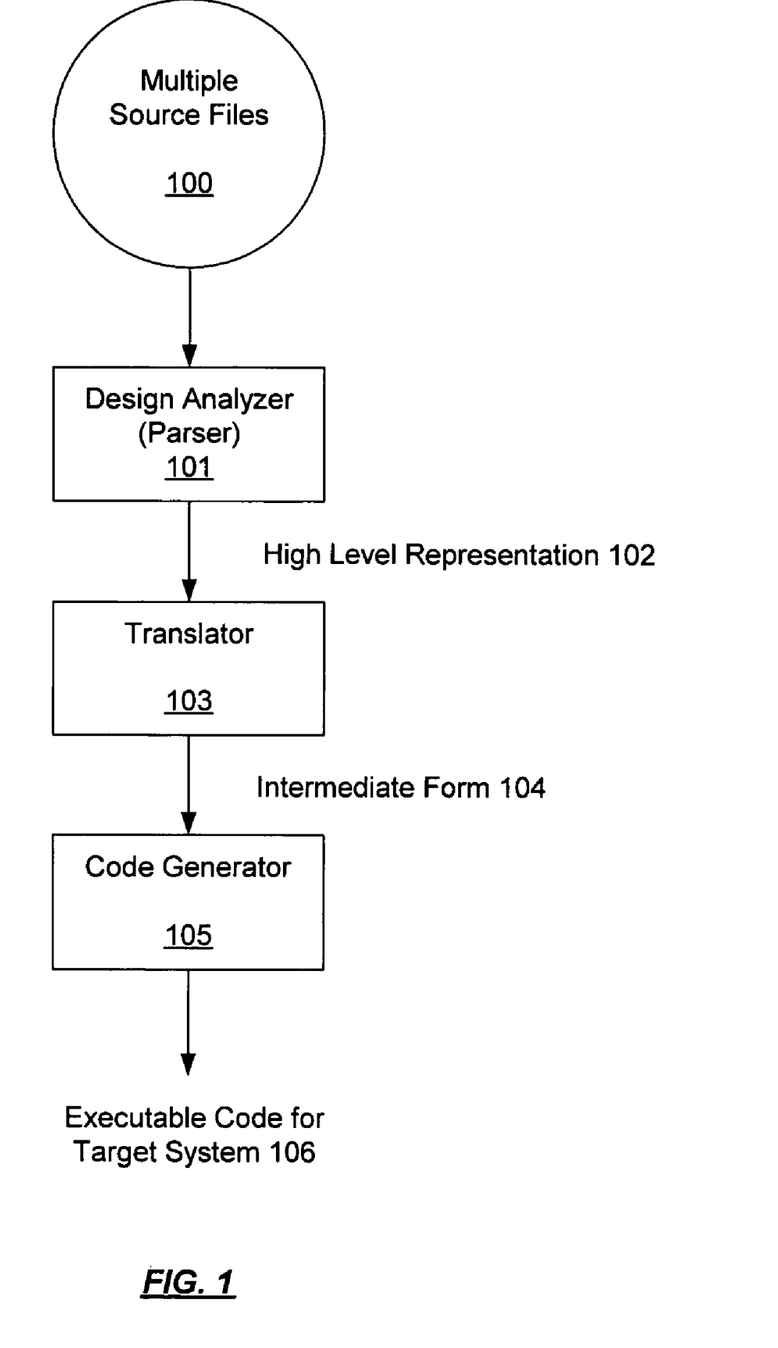
FIG. 1 is a flow diagram of a general compiler.

FIG. 1 shows the steps taken by an ordinary compiler. As illustrated in FIG. 1, the compiler comprises a parser 101, a translator 103, and a code generator 105. The parser 101 receives input in the form of source files 100 (e.g., C++ .cpp and .hpp files) and generates a high-level representation 102 of the source code. This high-level representation 102 may include, for example, a tokenized version of the source code file. The translator 103 receives the high level representation 102 and translates the operations into an intermediate form 104 that describes the operations. The intermediate form 104 is transformed by code generation process 105 into executable code 106 configured to run on a specific platform.

Compilers must parse source code to be able to translate it into object code. Parsing is often divided into lexical analysis and semantic parsing.

Tokens

Lexical analysis concentrates on dividing strings into components, called tokens, based on punctuation and other keys. Semantic parsing then attempts to determine the meaning of the string. A token is a sequence of characters that is treated as a unit in the grammar for a programming language. Tokens are grouped into types. Each token type is described by a pattern. A lexeme is the set of specific characters from a source file that match a pattern. Each language has its own token types, patterns and lexemes.

Token types include numbers, string literals, identifiers, character constants, reserved words (or keywords) and operators. Keywords are sequences of letters and possibly other characters that are reserved to the language. Common examples are "while", "if" and "return". Each keyword is a token. Operators are character sequences consisting of non-alphanumeric characters and are used by the language to represent operations. The operator may have one or more characters and must be unique. Examples are "+", ">=" and "(". Like the keyword token type, each operator is a token.

Each token pattern defines a language. Thus, the language for numbers is the set of all strings consisting only of the digits 0 through 9. The language for the reserved word, "if" consists of the single string, "if".

Certain source code structures do not constitute tokens. For example, comments, pre-processor directives, and spaces do not constitute tokens.

The token set is critical because it defines the operations comprising a computer program. Each programming language has a unique set of tokens. As such, each programming language requires a unique lexical analyzer.

Lexical Analysis

Lexical analyzers are typically subroutines of parsers. The parser invokes the lexical analyzer when it needs to examine the next token in a sequence. When the lexical analyzer is invoked, it reads input characters until it reaches the next token.

An example of a lexical analyzer is called Lex. Using Lex, a separate file containing definitions, analyzer rules and user subroutines must be written before source code can be analyzed by Lex.

Thus, Lex is a static program that is either generated by a tool to understand certain tokens or is programmed by hand. There is no way to instruct a lexical analyzer at runtime to understand new or added tokens in different languages. This approach is problematic because tokens can only be added by modifying the source code for the analyzer. This process is slow, prone to error and expensive.

SUMMARY OF THE INVENTION

The present invention provides a method and apparatus for the dynamically configurable lexical analysis of computer source code. The lexical analyzer is dynamically configured at runtime to recognize a one or more reserved words or operators. Thus, the lexical analyzer has the ability to interact with multiple languages without being rewritten from scratch.

In one or more embodiments of the present invention, the analyzer is instantiated by a host application, for example, the parser of a compiler. The host application adds a list of tokens to the analyzer that must be recognized. These tokens comprise at least a subset of the reserved words and operators of the computer language. In one embodiment, the host application then queries the lexical analyzer for the next token in the source code. In another embodiment, tokens are added during the query phase as needed. In a separate embodiment, tokens are dynamically removed from the analyzer as the needs of the host application change.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

This invention relates to a method and apparatus for the dynamic configuration of a lexical analysis parser. In the following description, numerous specific details are set forth in order to provide a more thorough understanding of the present invention. It will be apparent, however, to one skilled in the art that the present invention may be practiced without these specific details. Further, this invention in one or more embodiments may be implemented in the form of hardware and/or software.

Lexical Analysis

"Lexical analysis" is the phase of parsing responsible for the division of the source text presented to the parser into a set of "tokens" that are recognized as part of the lexicon of the language.

Figure 2A:
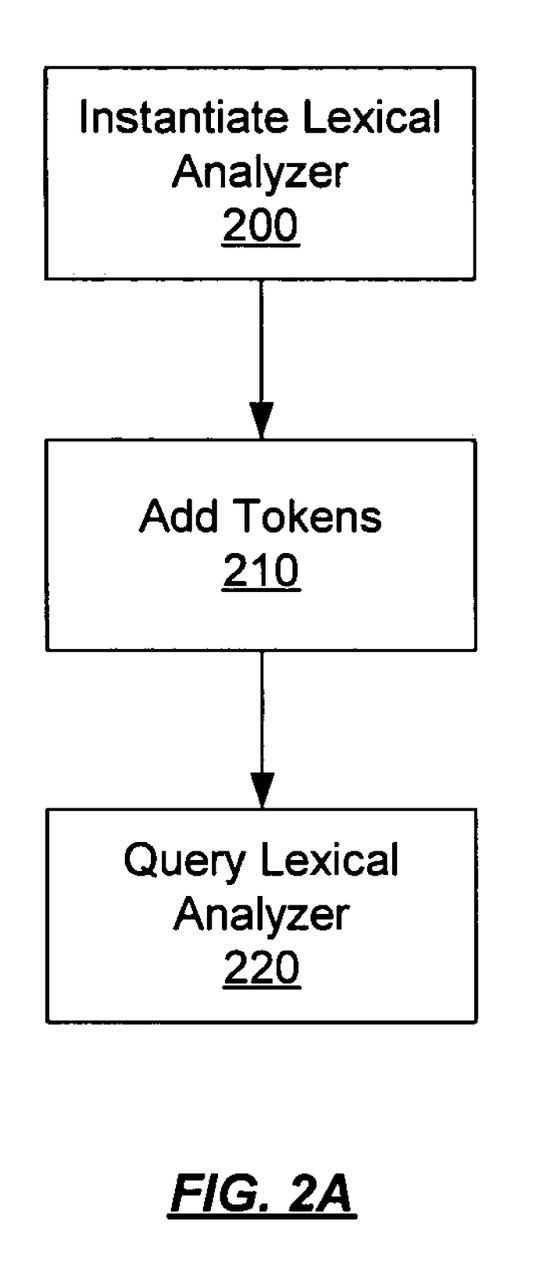
FIG. 2A is a flow diagram of an embodiment of the present invention.

FIG. 2A is a flow chart illustrating the methodology of one embodiment of the present invention. In block 200, the lexical analyzer is instantiated by a host application. In one embodiment, the host application is the parser component of a software compiler. In block 210, a set of tokens is added to an internal dictionary maintained by the analyzer. The dictionary is any data structure used to translate one value to another and known to those of skill in the art. The analyzer recognizes several different token types. In block 220, the analyzer is queried for the next token in sequence of the source code being analyzed.

Figure 3:
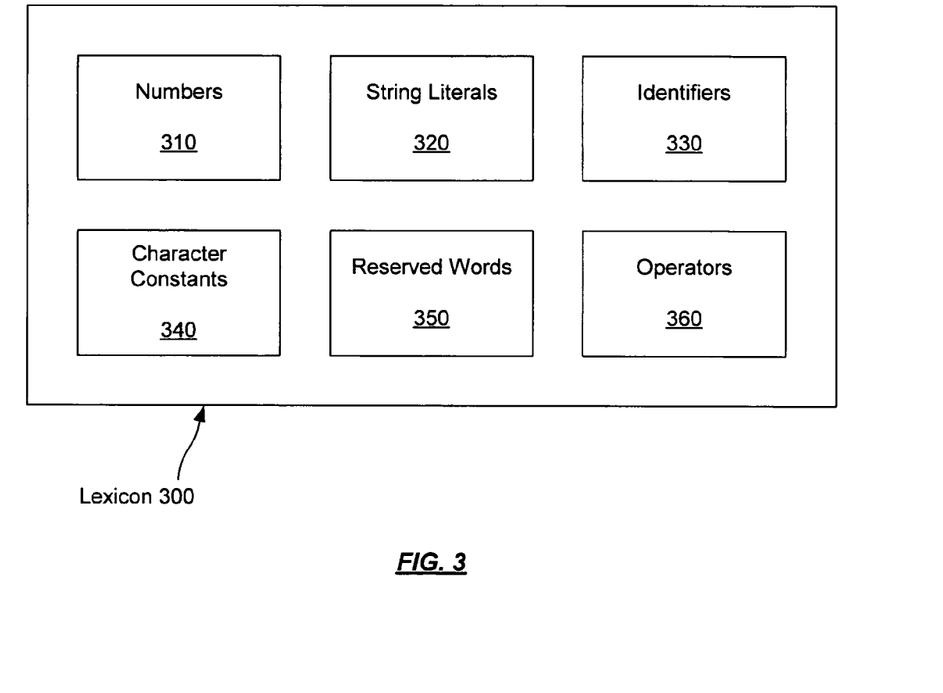
FIG. 3 illustrates the token types recognized by an embodiment of the present invention.

FIG. 3 illustrates the token types recognized by one embodiment of the present invention. Lexicon 300 is comprised of numbers 310, string literals 320, identifiers 330, character constants 340, reserved words 350, and operators 360. Immediately after the lexical analyzer is instantiated, the software recognizes token types 310–340. Reserved words 350 and operators 360 may be dynamically added to the lexical analyzer in accordance with one embodiment of the invention, in block 210 of FIG. 2A.

Figure 2B:
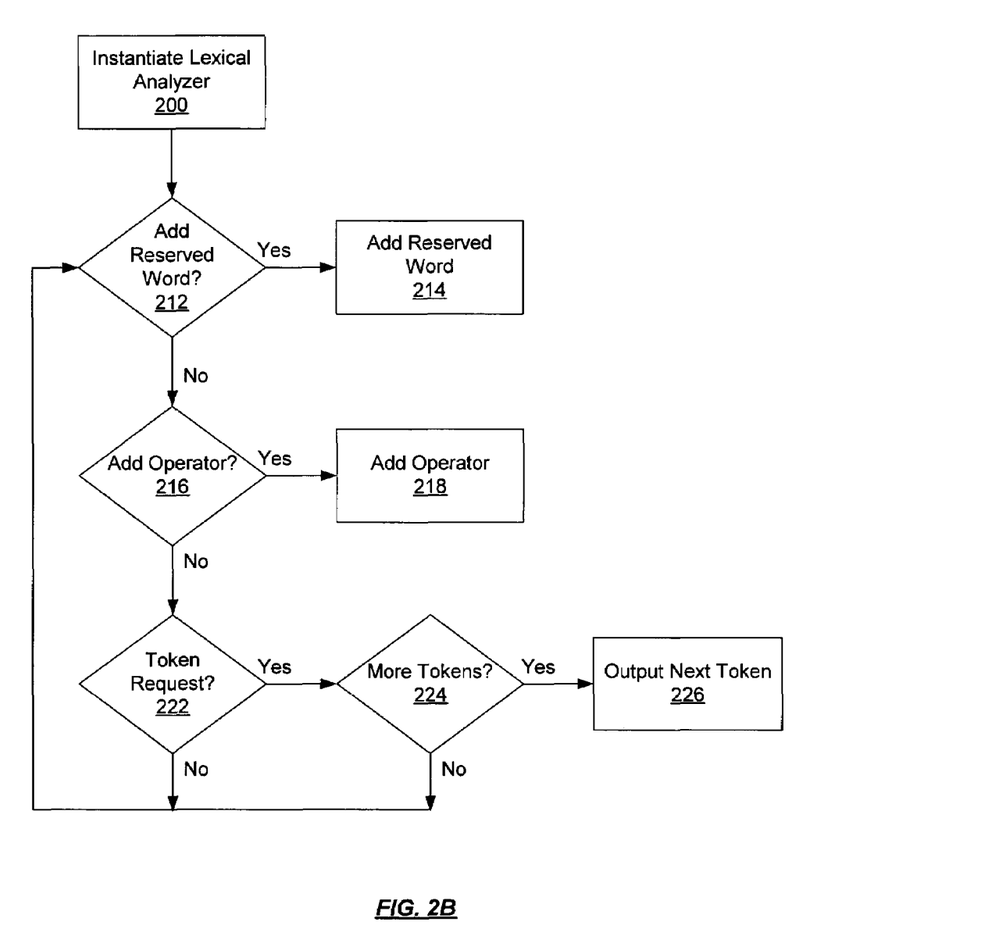
FIG. 2B is a flow diagram of another embodiment of the present invention.

FIG. 2B illustrates the operation of the lexical analyzer in accordance with another embodiment of the present invention. In block 200, the lexical analyzer is instantiated by a host application. Decision blocks 212, 216 and 222 represent event handlers of the lexical analyzer object. Block 212 determines whether the host application seeks to add a reserved word to the internal dictionary. If so, then in block 214 the reserved word is added. If not, then in block 216, a determination is made as to whether the host application seeks to add an operator to the internal dictionary. If so, then in block 218 the operator is added.

If the result of determination block 216 is negative, then in block 222 a determination is made as to whether the host application is requesting the next token in the source code sequence. If not, then the event loop continues at block 212. If yes, then in block 224 a determination is made as to whether any more tokens exist in the source code sequence. If not, the event loop continues at block 212. If yes, then in block 226 the lexical analyzer outputs the next token.

Figure 2C:
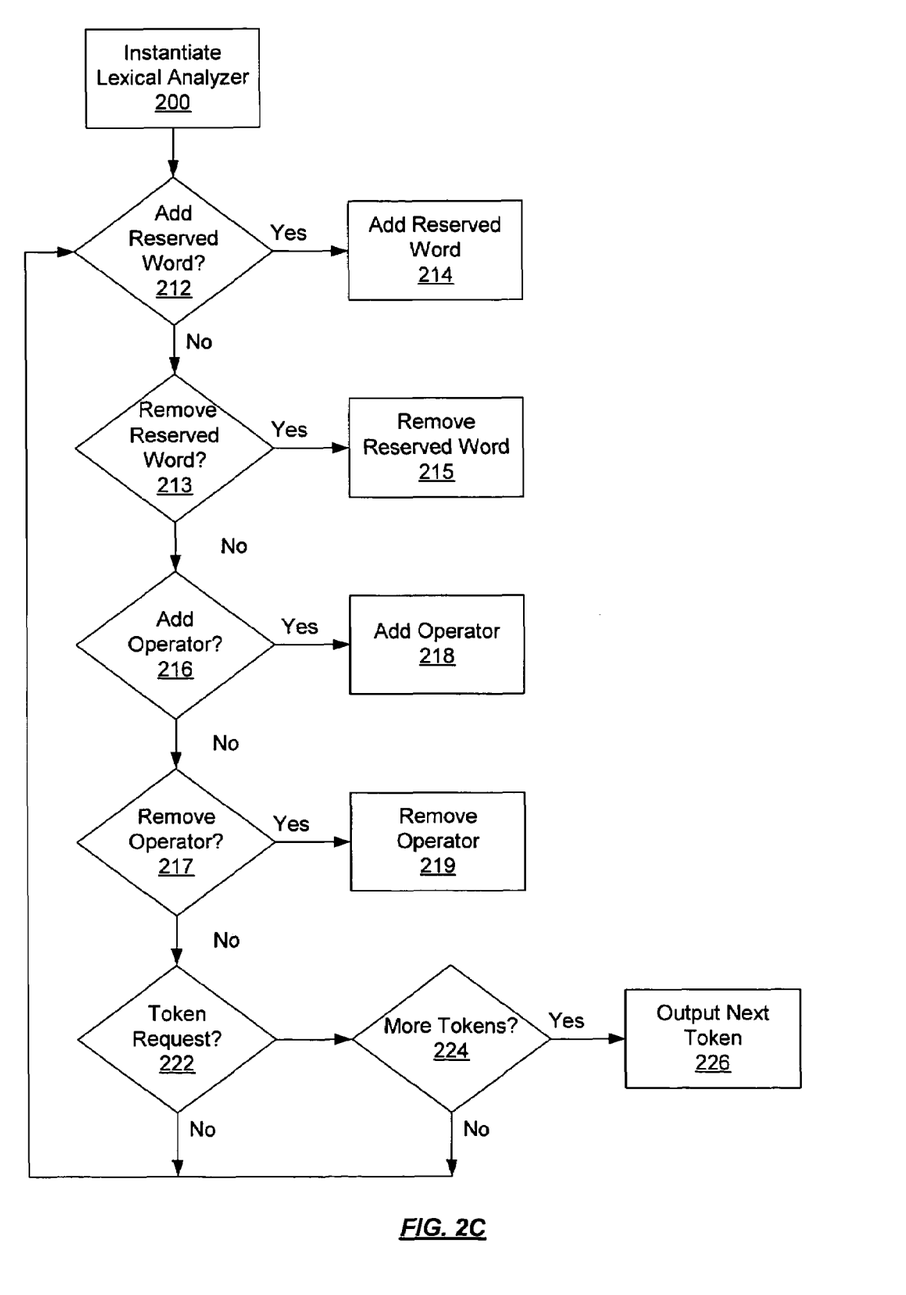
FIG. 2C is a flow diagram of a different embodiment of the present invention.

FIG. 2C is a flow chart illustrating another embodiment of the present invention. In block 200, the lexical analyzer is instantiated by a host application. Decision blocks 212, 213, 216, 217 and 222 represent event handlers of the lexical analyzer object. Block 212 determines whether the host application seeks to add a reserved word to the internal dictionary. If yes, then in block 214 the reserved word is added. If not, then decision block 213 determines whether the host application seeks to remove a reserved word. If yes, then in block 215 a reserved word is removed from the internal dictionary. If not, then in block 216, a determination is made as to whether the host application seeks to add an operator to the internal dictionary. If yes, then in block 218, the operator is added. If not, then in block 217, a determination is made as to whether the host application seeks to remove an operator from the internal dictionary. If yes, then in block 219, the operator is removed.

If the result of determination block 217 is negative, then in block 222 a determination is made as to whether the host application is requesting the next token in the source code sequence. If not, then the event loop continues at block 212. If yes, then in block 224 a determination is made as to whether any more tokens exist in the source code sequence. If not, then the event loop continues at block 212. If yes, then in block 226 the lexical analyzer outputs the next token.

Figure 4:
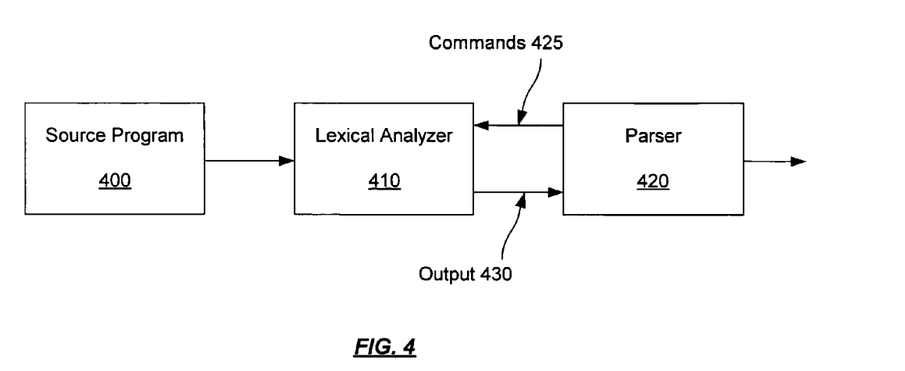
FIG. 4 illustrates the interaction of a lexical analyzer and a parser in accord with one or more embodiments of the present invention.

FIG. 4 illustrates the relationship between one embodiment of a lexical analyzer and parser. Source program 400 is analyzed by lexical analyzer 410 under direction of parser 420. Parser 420 issues commands 425 to lexical analyzer 410. These commands comprise modifications (e.g., additions) to the list of recognized tokens maintained by the lexical analyzer, as well as requests for tokens in the sequence of source program 400. Lexical analyzer 410 sends output 430 to parser 420 in response to token request 425.

Token Entry Application Program Interface (API)

Figure 5:
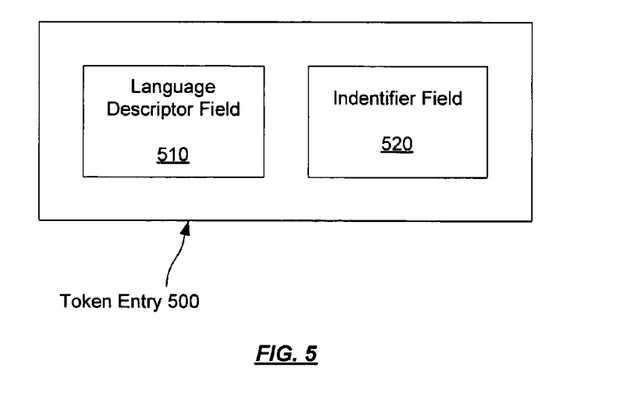
FIG. 5 illustrates the structure of a token entry in accord with one embodiment of the present invention.

FIG. 5 illustrates the structure of a token entry API according to one embodiment of the present invention. The token entry API enables the entry of reserved word and operator tokens into the internal dictionary of the lexical analyzer so that users have an enhanced ability to modify a given token set at runtime. Token entry 500 is comprised of language descriptor field 510 and identifier field 520. In one embodiment, the identifier is a numeric constant that represents the token value. For example, reserved word tokens are added to a lexical analyzer instantiated as "lex" in the following manner:

lex.addReservedWord ("while", T_WHILE)
   lex.addReservedWord ("if", T_IF)

and operator token are added as follows:

lex.addOperator ("+=", T_PLUSEQ)
   lex.addOperator ("[", T_SQUARE)

Figure 6:
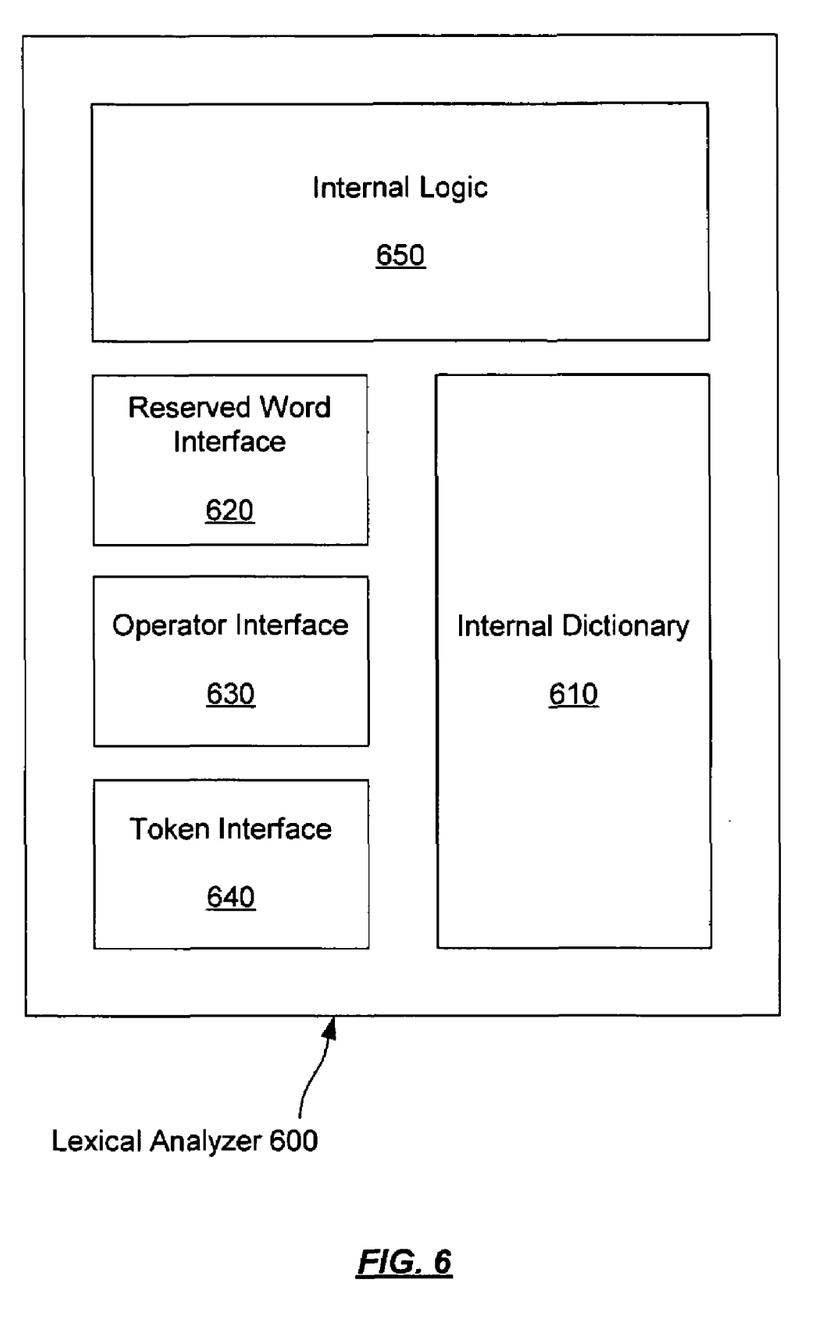
FIG. 6 illustrates the architecture of the lexical analyzer software in accord with one embodiment of the present invention.

FIG. 6 illustrates the architecture of the lexical analyzer software in accordance with one embodiment of the present invention. Lexical analyzer 600 is comprised of internal dictionary 610, reserved word interface 620, operator interface 630, token interface 640, and internal logic 650. Internal dictionary 610 is a data structure so configured as to translate language descriptors to token values. Reserved word interface 620 enables a host application to manipulate the reserved word entries in internal dictionary 610. Operator interface 620 enables a host application to manipulate the operator entries in internal dictionary 610. Token interface 640 enables a host application to request tokens from lexical analyzer 600.

Embodiment of Computer Execution Environment (Hardware)

Figure 7:
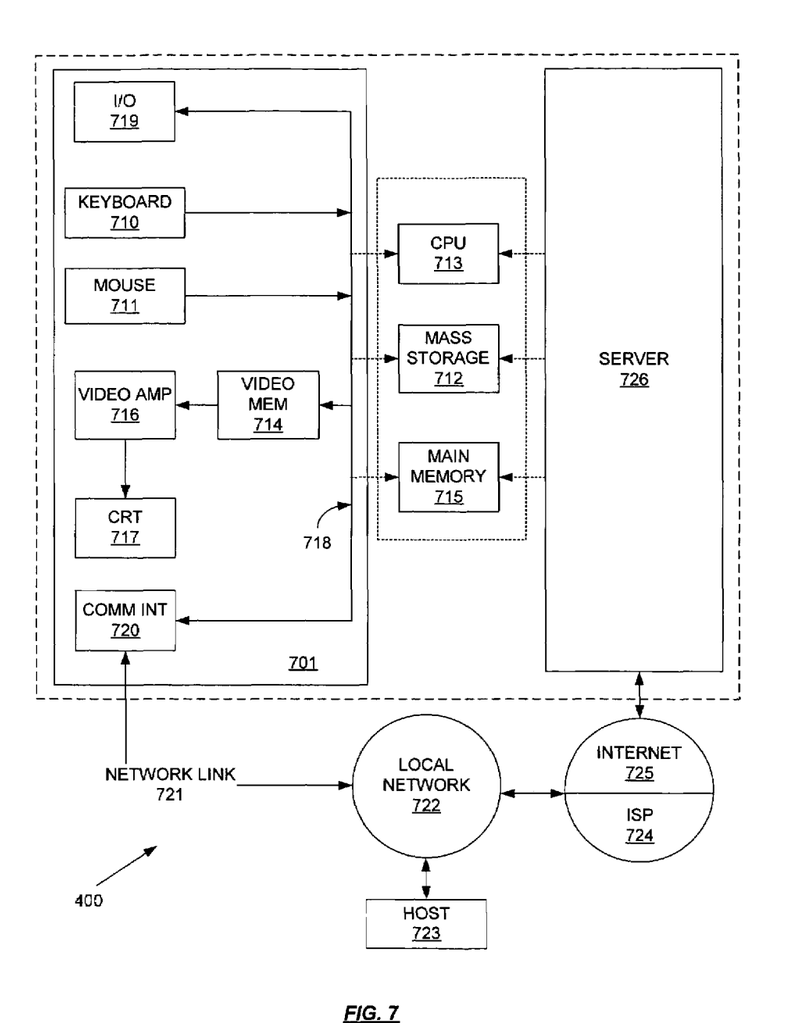
FIG. 7 is an illustration of an embodiment of a computer execution environment.

An embodiment of the invention can be implemented as computer software in the form of computer readable program code executed in a general purpose computing environment such as environment 700 illustrated in FIG. 7, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 710 and mouse 711 are coupled to a system bus 718. The keyboard and mouse are for introducing user input to the computer system and communicating that user input to central processing unit (CPU) 713. Other suitable input devices may be used in addition to, or in place of, the mouse 711 and keyboard 710. I/O (input/output) unit 719 coupled to bi-directional system bus 718 represents such I/O elements as a printer, A/V (audio/video) I/O, etc.

Computer 701 may include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Wireless links are also possible. In any such implementation, communication interface 720 sends and receives electrical, electromagnetic or optical signals which carry digital data streams representing various types of information.

Network Link 721 typically provides data communication through one or more networks to other data devices. For example, network link 721 may provide a connection through local network 722 to local server computer 723 or to data equipment operated by ISP 724. ISP 724 in turn provides data communication services through the world wide packet data communication network now commonly referred to as the "Internet" 725. Local network 722 and Internet 725 both use electrical, electromagnetic, or optical signals which carry digital data streams. The signals through the various networks and the signals on network link 721 and through communication interface 720, which carry the digital data to and from computer 701, are exemplary forms of carrier waves transporting the information.

Processor 713 may reside wholly on client computer 701 or wholly on server 726 or processor 713 may have its computational power distributed between computer 701 and server 726. Server 726 symbolically is represented in FIG. 7 as one unit, but server 726 can also be distributed between multiple "tiers". In one embodiment, server 726 comprises a middle and back tier where application logic executes in the middle tier and persistent data is obtained in the back tier. In the case where processor 713 resides wholly on server 726, the results of the computations performed by processor 713 are transmitted to computer 701 via Internet 725, Internet Service Provider (ISP) 724, local network 722 and communication interface 720. In this way, computer 701 is able to display the results of the computation to a user in the form of output.

Computer 701 includes a video memory 714, main memory 715 and mass storage 712, all coupled to bi-directional system bus 718 along with keyboard 710, mouse 711 and processor 713. As with processor 713, in various computing environments, main memory 715 and mass storage 712, can reside wholly on server 726 or computer 701, or they may be distributed between the two. Examples of systems where processor 713, main memory 715, and mass storage 712 are distributed between computer 701 and server 726 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 712 may include both fixed and removable media, such as magnetic, optical or magnetic optical storage systems or any other available mass storage technology. Bus 718 may contain, for example, thirty-two address lines for addressing video memory 714 or main memory 715. The system bus 718 also includes, for example, a 32-bit data bus for transferring data between and among the components, such as processor 713, main memory 715, video memory 714 and mass storage 712. Alternatively, multiplex data/address lines may be used instead of separate data and address lines.

In one embodiment of the invention, the processor 713 is a SPARC microprocessor from Sun Microsystems, Inc., a microprocessor manufactured by Motorola, such as the 680X0 processor, or a microprocessor manufactured by Intel, such as the 80X86 or Pentium processor. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable apparatus. This circuitry converts pixel data stored in video memory 714 to a raster signal suitable for use by monitor 717. Monitor 717 is a type of monitor suitable for displaying graphic images.

Computer 701 can send messages and receive data, including program code, through the network(s), network link 721, and communication interface 720. In the Internet example, remote server computer 726 might transmit a requested code for an application program through Internet 725, ISP 724, local network 722 and communication interface 720. The received code may be executed by processor 713 as it is received, and/or stored in mass storage 712, or other non-volatile storage for later execution. In this manner, computer 701 may obtain application code in the form of a carrier wave. Alternatively, remote server computer 726 may execute applications using processor 713, and utilize mass storage 712, and/or video memory 715. The results of the execution at server 726 are then transmitted though Internet 725, ISP 724, local network 722, and communication interface 720. In this example, computer 701 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a dynamically configurable lexical analyzer is described in conjunction with one or more specific embodiments. The invention is defined by the following claims and their full scope an equivalents.

What is claimed is:

1. A method for converting a source program into a plurality of tokens on a computer system, comprising:
   obtaining one or more entries;
   analyzing said source program using said computer system; and
   generating said plurality of tokens from said source program at runtime using said computer system,
   wherein said entries are used to generate a subset of said plurality of tokens, and
   wherein at least one of said entries is dynamically added at runtime to recognize one or more reserved words or operators.

2. The method of claim 1 wherein said entries comprise a language descriptor and a token value.

3. The method of claim 2 wherein the analyzing comprises:
   obtaining a lexeme from said source program; and
   determining if said lexeme matches one of said language descriptors.

4. The method of claim 3 wherein the analyzing further comprises:
   obtaining said token value if said lexeme matches one of said language descriptors.

5. The method of claim 4 wherein the analyzing further comprises:
   obtaining a next lexeme from said source program.

6. The method of claim 5 wherein the generating comprises:
   outputting said token value in response to a request from a host program.

7. The method of claim 6 wherein said language descriptor is a reserved word.

8. The method of claim 6 wherein said language descriptor is an operator.

9. The method of claim 1 wherein the obtaining further comprises:
   entering said entries into a token dictionary.

10. A computer program product comprising:
    a computer usable medium having computer readable program code embodied therein configured to convert source program into a plurality of tokens, said computer program product comprising:
    computer readable code configured to cause a computer to obtain one or more entries;
    computer readable code configured to cause a computer to analyze said source program; and
    computer readable code configured to cause a computer to generate said plurality of tokens from said source program at runtime,
    wherein said entries are used to generate a subset of said plurality of tokens, and
    wherein at least one of said entries is dynamically added at runtime to recognize one or more reserved words or operators.

11. The computer program product of claim 10 wherein said entries comprise a language descriptor and a token value.

12. The computer program product of claim 11 wherein said computer code configured to cause a computer to analyze the source program comprises:
    computer readable code configured to cause a computer to determine if said lexeme matches one of said language descriptors.

13. The computer program product of claim 12 wherein said computer code configured to cause a computer to analyze said source program further comprises:
    computer readable code configured to cause a computer to obtain said token value if said lexeme matches one of said language descriptors.

14. The computer program product of claim 13 wherein said computer code configured to cause a computer to analyze said source program further comprises:
    computer readable code configured to cause a computer to obtain a next lexeme from said source program.

15. The computer program product of claim 14 wherein said computer code configured to cause a computer to generate said plurality of tokens comprises:
    computer readable code configured to cause a computer to output said token value in response to a request from a host program.

16. The computer program product of claim 15 wherein said language descriptor is a reserved word.

17. The computer program product of claim 15 wherein said language descriptor is an operator.

18. The computer program product of claim 10 wherein said computer code configured to cause a computer to obtain one or more entries further comprises:
    computer readable code configured to cause a computer to enter said entries into a token dictionary.

19. A lexical analyzer, comprising:
    one or more entries configured to be obtained;
    a source program analyzer; and
    a plurality of tokens configured to be generated at runtime from said source program analyzer,
    wherein said entries are used to generate a subset of said plurality of tokens, and
    wherein at least one of said entries is dynamically added at runtime to recognize one or more reserved words or operators.

20. The lexical analyzer of claim 19, wherein said entries comprise a language descriptor and a token value.

21. The lexical analyzer of claim 20 wherein said source program analyzer comprises:
    a source program interface, wherein said source program interface obtains a lexeme from a source program; and
    a lexeme comparator, wherein said lexeme comparator determines whether said lexeme matches one of said language descriptors.

22. The lexical analyzer of claim 21, wherein said source program analyzer further comprises:
    a token output interface, wherein said interface generates said token if said lexeme matches one of said language descriptors.

23. The lexical analyzer of claim 22, wherein said source program interface further comprises:
    a source program manager, wherein said manager obtains a next lexeme from said source program.

24. The lexical analyzer of claim 23, wherein said output interface comprises:
    a host program event handler, wherein said event handler causes said output interface to generate said token value in response to a request from the host program.

25. The lexical analyzer of claim 24, wherein said language descriptor is a reserved word.

26. The Lexical analyzer of claim 24, wherein said language descriptor is an operator.

27. The lexical analyzer of claim 19, further comprising:
    a token dictionary, wherein said entries comprise dictionary entries.

* * * * *